United States Patent [19]

Pitchford

[11] Patent Number: 4,541,498
[45] Date of Patent: Sep. 17, 1985

[54] APPARATUS FOR INCREASING VEHICLE MOBILITY

[76] Inventor: A. H. Pitchford, 5905 SW. Mapp Rd., Palm City, Fla. 33490

[21] Appl. No.: 540,329

[22] Filed: Oct. 11, 1983

[51] Int. Cl.⁴ .................. B62D 55/04; B62D 55/02
[52] U.S. Cl. .................................. 180/9.26; 305/15; 305/35 EB; 180/9.28
[58] Field of Search ............... 305/15, 35 EB, 9; 180/9.32, 9.26, 9.28, 9.3, 15, 16

[56] References Cited

U.S. PATENT DOCUMENTS

| | | | |
|---|---|---|---|
| 1,572,943 | 2/1926 | McKinley | 305/9 X |
| 3,288,234 | 11/1966 | Feliz | 305/35 EB |
| 3,299,849 | 1/1967 | Pitchford | 180/6.7 X |
| 4,204,583 | 5/1980 | Toyoura | 180/9.28 |

Primary Examiner—David A. Scherbel
Assistant Examiner—Mark J. Abate
Attorney, Agent, or Firm—Rodgers & Rodgers; Rodgers & Rodgers

[57] ABSTRACT

Apparatus adapted to be mounted on a vehicle frame for the purpose of increasing traction comprises an L-shaped framework, a first shaft rotatably mounted on the upper portion of the framework, a second shaft rotatably mounted on the framework and disposed below and spaced from the first shaft, spaced third, fourth and fifth shafts rotatably mounted on the framework and extending outwardly from the second shaft, a power source operable to rotate the first shaft, means interconnecting the first and second shafts to impart rotation to the second shaft, multiple wheels fixed in coaxial relationship respectively on the second, third, fourth and fifth shafts, track means mounted on the peripheries of the wheels, brake means associated with the first shaft and operable to fix the framework to the vehicle, and a second brake means operable to fix the framework to the second shaft.

20 Claims, 11 Drawing Figures

APPARATUS FOR INCREASING VEHICLE MOBILITY

TECHNICAL FIELD

This invention relates to means for increasing the mobility of a standard roadway vehicle and making it adaptable to traverse difficult terrain conditions such as mud, sand and snow. In addition the invention allows a wheeled vehicle to travel over such obstacles as ditches, logs and steep banks. When the apparatus is disengaged and in a stored or standby position, it imposes no degradation or modified condition to the standard vehicle drive system. It is an add-on for wheeled and tracked vehicles and is attached to the vehicle's hydraulic and propulsion systems.

BACKGROUND ART

Various means for increasing vehicle mobility are known such as those disclosed and claimed in U.S. Pat. Nos. 3,299,849 and 3,306,250. Known devices have generally embodied complicated systems for the positioning of the track means and are often quite expensive and prone to a multitude of maintenance problems.

DISCLOSURE OF THE INVENTION

By this invention, a vertically maneuverable apparatus is provided for increasing vehicle mobility and comprises a framework, a pair of shafts spaced apart and mounted on the framework in generally parallel relation, a power source operable to rotate one shaft, means interconnecting both shafts and operable to impart rotation to the other shaft, track means enveloping the other shaft, and brake means operable to independently fix the framework with respect to the vehicle and to fix the track means with respect to the framework.

BEST MODE FOR CARRYING OUT THE INVENTION

Figure 1:
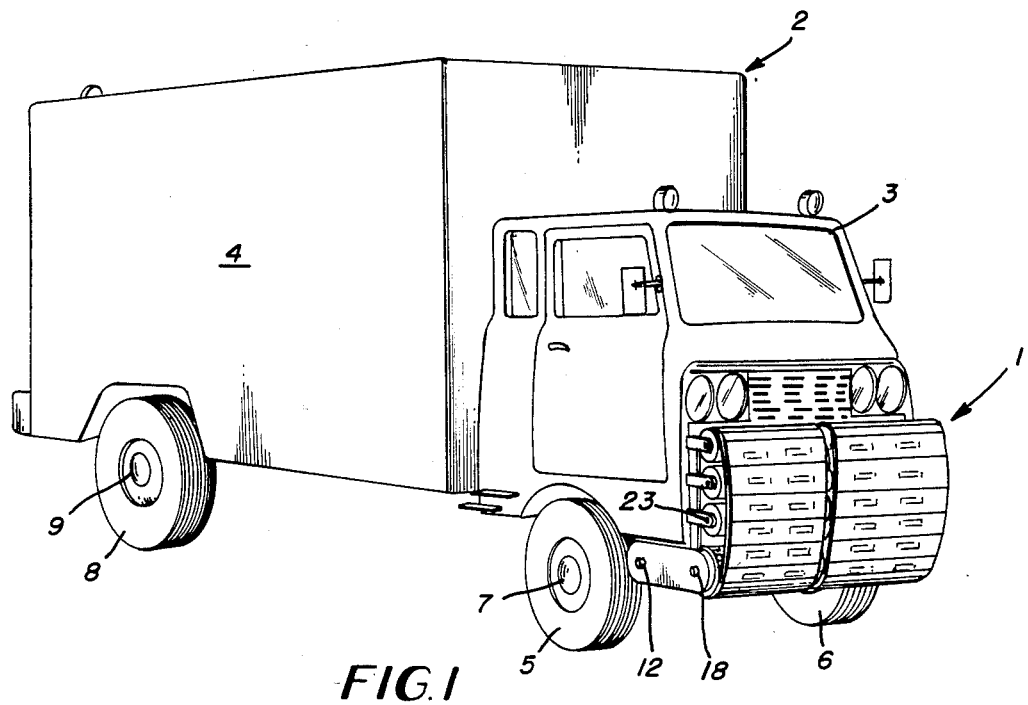
FIG. 1 is a perspective view of a vehicle with apparatus mounted thereon according to this invention.

In the drawings and with particular reference to FIG. 1, the apparatus constructed according to this invention is generally designated by the numeral 1. Apparatus 1 is attached to a road vehicle which is generally designated by the numeral 2. More specifically vehicle 2 comprises cab 3 and body 4. Associated with vehicle 2 are wheels 5 and 6 which are mounted in a conventional manner on wheel axle 7. Also a pair of wheels are associated with the rear of the vehicle one of which is shown in FIG. 1 and is identified by the numeral 8. Likewise the rear wheels are mounted in a conventional manner on wheel axle 9. Although not shown in FIG. 1, the entire vehicle 2 is mounted in known manner on vehicle frame 10.

Figure 2:
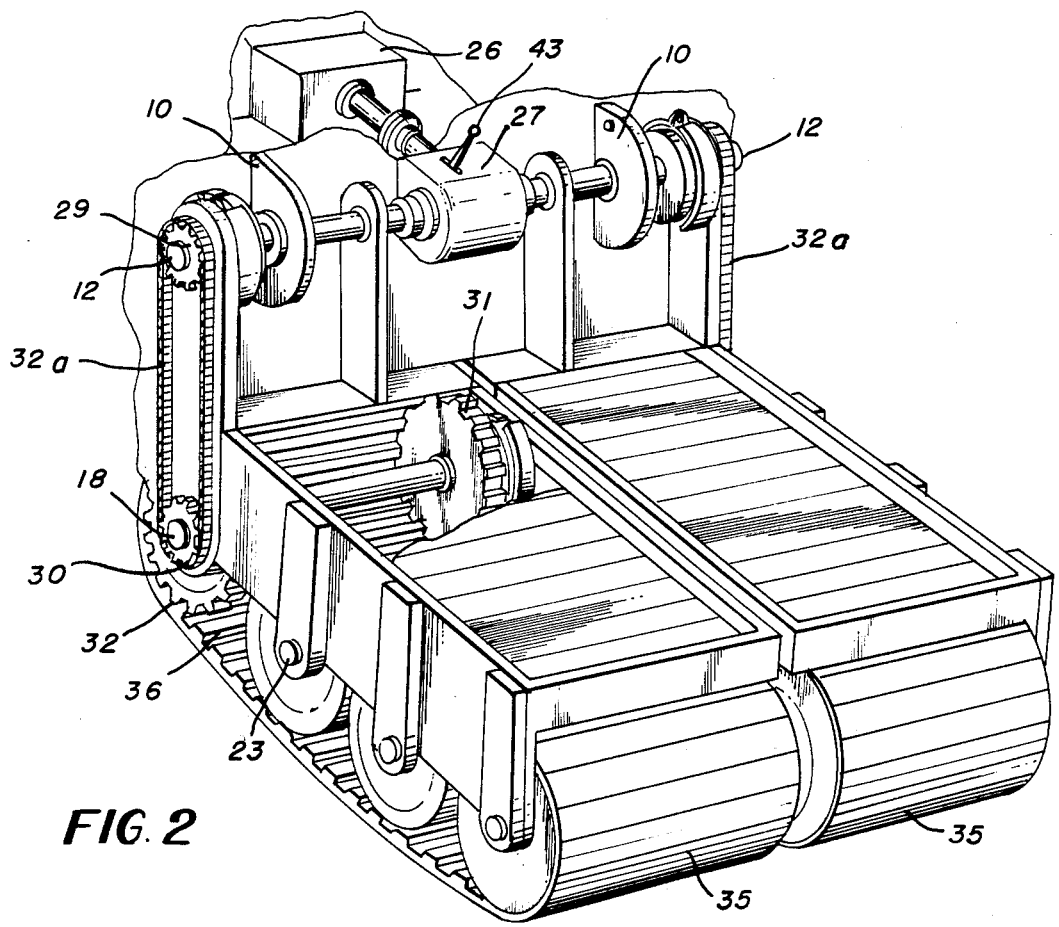
FIG. 2 is an enlarged perspective view of the apparatus constructed according to this invention.
Figure 3:
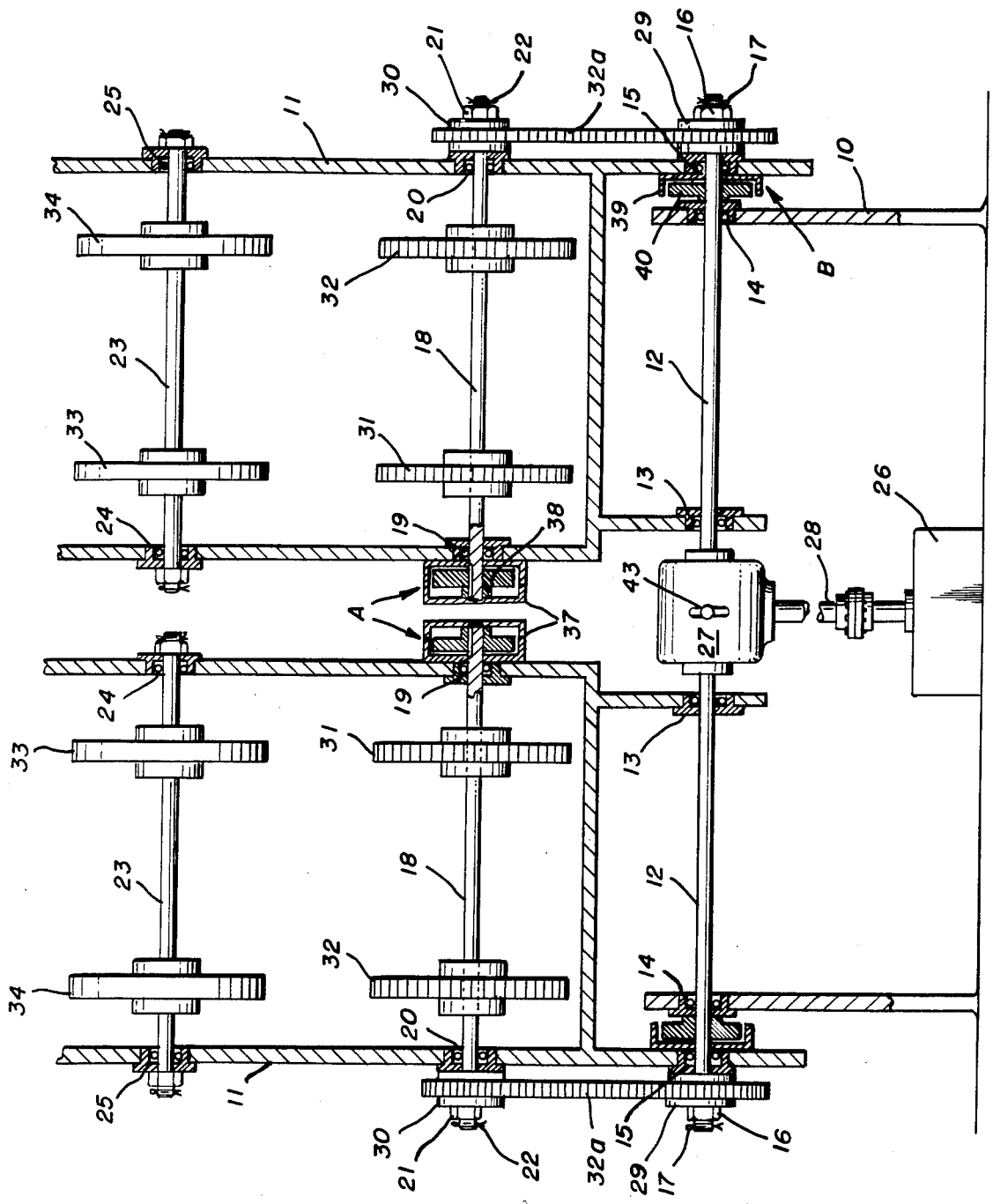
FIG. 3 is a schematic view from above of the apparatus.

Apparatus 1, as shown in FIGS. 1-3, essentially comprises a pair of side-by-side identical units and therefore only one unit will be discussed in detail the other unit being identical in mirror image. With particular reference to FIG. 3 which depicts apparatus 1 in schematic form, the numeral 11 designates the apparatus framework. Shaft 12 is rotatably mounted in frame 11 by means of bearings 13, 14 and 15. In addition shaft 12 is secured at its outer end by means of bolt 16 and pin 17.

In like manner, shaft 18 is rotatably mounted in framework 11 by means of bearings 19 and 20 and disposed on the outer end thereof are bolt 21 and pin 22. Finally shaft 23 is rotatably mounted in framework 11 by means of bearings 24 and 25. Of course the length of apparatus 1 can be extended by simply adding additional shafts and accompanying mechanisms. In fact apparatus 1, as shown in FIGS. 1 and 2, embodies an upper shaft such as shaft 12 and four lower shafts corresponding to shafts 18 and 23 shown in FIG. 3.

The power source for apparatus 1 is indicated schematically by the numeral 26 in FIG. 3 and which may be a mechanical power take off or a hydrostatic pump and motor either one of which driven by the engine of vehicle 2. A rotational force is provided from power source 26 to transaxle 27 by means of drive train 28. Transaxle 27 could also take the form of a differential or a hydrostatic transmission. In addition sprocket 29 is fixed to shaft 12 and, likewise, sprocket 30 is fixed to shaft 18. For the purpose of conveying rotation from transaxle 27 through shaft 12 to shaft 18, chain 32a is conventionally mounted on sprockets 29 and 30. Other drive mechanisms could also be used such as a gear or fluid drive.

According to this invention, sprocket track drive wheels 31 and 32 are fixed to shaft 18 and bogie wheels 33 and 34 are fixed to shaft 23. Track 35 is disposed in an enveloping fashion around the peripheries of sprockets 31 and 32 and bogie wheels 33 and 34 and any additional bogie wheels and shafts, as necessary, for example as shown in FIGS. 1 and 2. The sprocket elements of sprockets 31 and 32 are adapted to fit in grooves 36 of track 35 to impart a turning motion to track 35 as is well known. Track 35 can be constructed of various materials such as rubber reinforced by layers of nylon or other fabric materials as well as metal. Bogie wheels 33 and 34 can be constructed of steel, rubber covered with steel or various aluminium alloys. Of course sprockets 31 and 32 and bogie wheels 33 and 34 can be of varying widths and even as wide as track 35, is desired.

According to this invention, brakes A and B are provided. More specifically brake A comprises brake drum 37 which is fixed to shaft 18 and brake shoe 38 which is mounted on framework 11. Brake drum 39 of brake B is fixed to framework 11 and brake shoe 40 of brake B is attached to vehicle frame 10. Of course brakes A and B can be of the conventional brake shoe and brake drum devices but also could be constructed of known mechanisms such as a disc brake or clutch in the form of a disc clutch. Either may be hydraulic or mechanically actuated.

Figure 7:
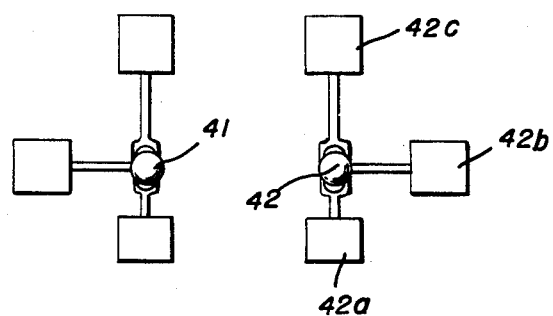
FIGS. 7 and 8 are schematic representations of the hand control mechanisms for the apparatus.
Figure 8:
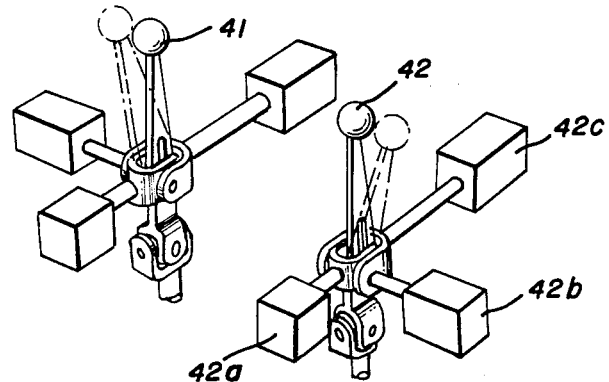

With reference to FIGS. 7 and 8, the control mechanisms are schematically depicted in that control stick 41 is associated with the left hand track and control stick 42 is associated with the right hand track. Of course control mechanisms 41 and 42 are suitably interconnected with brakes A and B in known manner such as by hydraulic, pneumatic, or mechanical means. Finally, as schematically shown in FIG. 3, apparatus 1 can be manually, electrically or hydraulically controlled by control lever 43 which is interrelated with transaxle or differential 27 for neutral, forward or reverse operation of the tracks or can be controlled by changing the direction of rotation of the hydrostatic motor.

Figure 6:
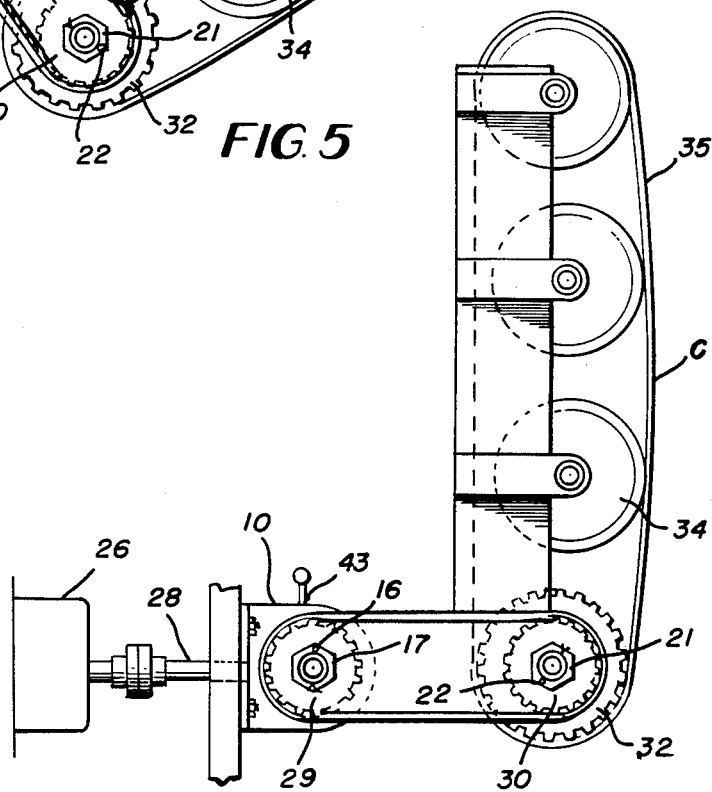

In actual operation, initially apparatus 1 is stored in the upright position as shown in FIG. 6 with brakes B locked. Since control stick 41 is interconnected with the left track, only the operation of control stick 42 and related mechanisms will be discussed in detail because the two are identical. With the power source at idling speed, transaxle lever 43 is placed in the forward position. Control stick 42 is pushed forward slowly disengaging brake B and engaging brake A and apparatus 1 will begin to lower to the ground by operation of a braking action of brake B on shaft 12. When track 1 is disposed at the desired position, control stick 42 is pulled back quickly which will fully engage brake B and disengage brake A. Track 35 is then disposed in a position to provide additional pulling power to vehicle 2. Of course by placing the transaxle in neutral or middle position as shown in FIGs. 6 and 7, track 35 is stopped and will be in effect free wheeling.

When it is desired to turn the vehicle sharply to the right, control stick 42 is left in the rear position and moved to the right to engage control mechanism 42b which in turn engages brake A causing track 35 to stop moving. Since the left hand track, controlled by control stick 41, is still moving, the vehicle will turn sharply to the right. This causes the left hand track to turn at a speed twice the speed if both tracks were turning. Of course if it is desired to turn the vehicle to the left, the reverse procedure is employed.

When it is desired to raise track 35, the direction of rotation of track 35 is reversed by means of transaxle or differential 27 or by reversing the direction of the hydrostatic motor drive as is well known. By pushing control stick 42 forward and engaging control mechanism 42c, brake B is thereby unlocked and brake A is locked. Track 35 then stops turning and apparatus 1 begins to rise to any desired position which in effect is the reverse operation to that discussed above in connection with lowering apparatus 1. For instance apparatus 1 may be left in an angled position such as is desirable for climbing steep banks or moving through sand or snow. By engaging brake B, apparatus 1 will be locked in position. Of course in the upper or stored position as shown in FIG. 6, the transaxle, differential or hydraulic motor should be placed in neutral to stop the track from rotating and brake B should be left in the engaged position.

Figure 4:
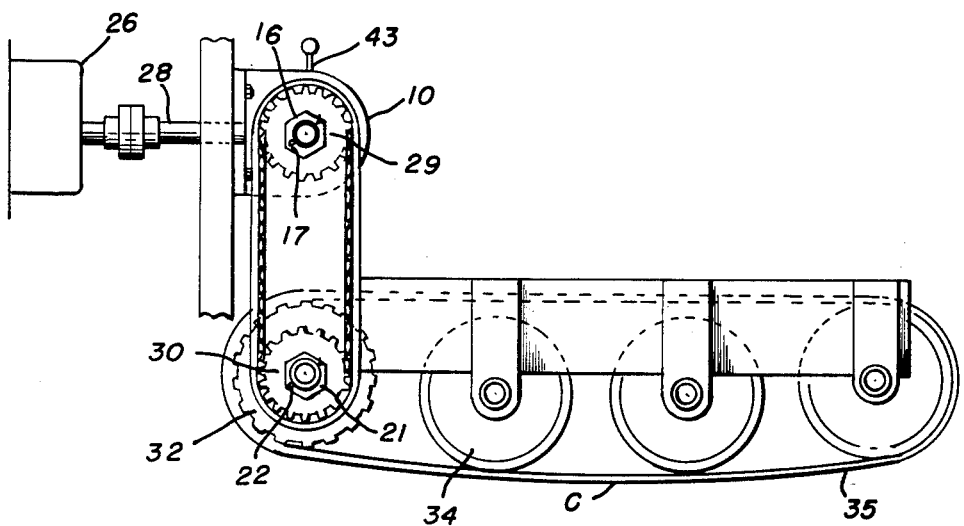
FIGS. 4, 5 and 6 are side elevational views showing the apparatus in the lowered, intermediate and raised positions respectively.
Figure 5:
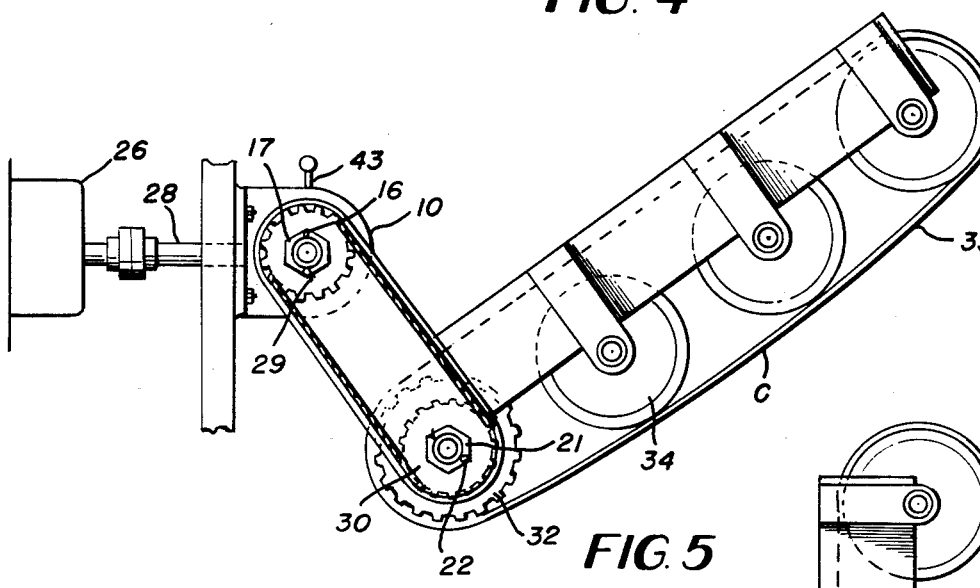

As best shown in FIG. 1, apparatus 1 is mounted in such manner that when it is in the raised position all elements thereof are disposed at a level equal to or above wheel axles 7 and 8. In this manner, apparatus 1 does not extend below the lowermost portion of the underbody of vehicle 2 and therefore does not reduce the height of objects over which vehicle 2 can travel. In addition, as best shown in FIGS. 4–6, the mid point C of the lower portion of track 35 is disposed lower than the ends thereof. This in effect gives greater ground pressure in the center of apparatus 1 than at the ends thereof which in turn provides a pivot point for easier turning in soft terrain. Also it can be seen that apparatus 1 could be easily mounted on the rear of vehicle 2 as well as the front.

Figure 9:
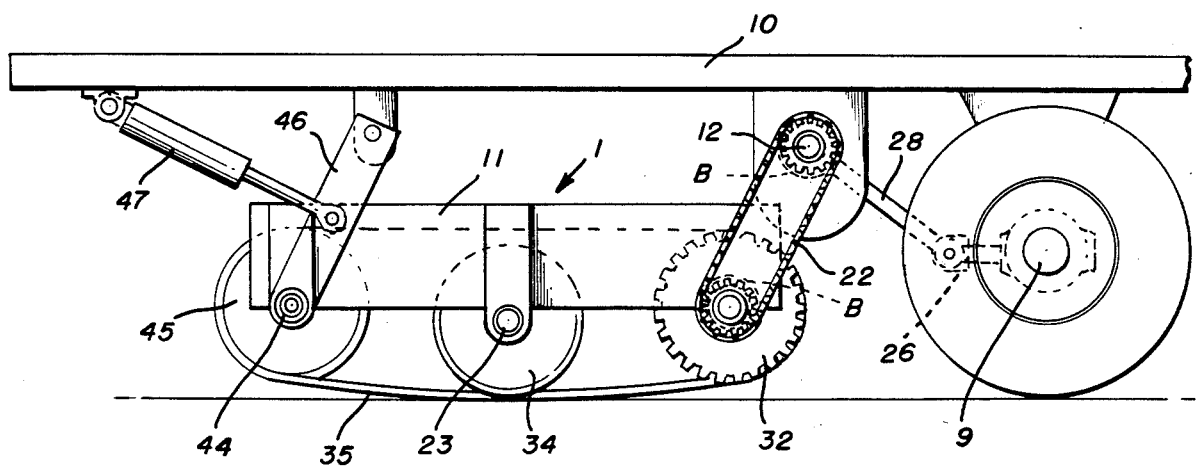
FIG. 9 is a side elevational view of a modified form of the invention as mounted on the underside of the vehicle.

A modified form of the invention is shown in FIG. 9 and essentially comprises the same elements as discussed above in connection with FIGS. 1–8 and, for those elements, like numerals are used. Shaft 44 is rotatably mounted in framework 11 and bogie wheel 45 is mounted thereon. Shaft 44 essentially functions the same as shaft 23 which is best shown in FIG. 3. In addition support member 46 is rotatably mounted on vehicle frame 10 at one end and to shaft 44 at the other end. Hydraulic cylinder 47 is fixed at one end to vehicle frame 10 and at the other end is rotatably mounted on support member 46. Therefore when hydraulic cylinder 47 is activated, in known manner, apparatus 1 can be raised or lowered as desired. Of course side-by-side apparatus can be utilized as shown in FIGS. 1–3 or a single wide unit may be used as desired. Transaxle or differential 27 (not shown in FIG. 9) may be powered by a mechanical power take off or a hydrostatic motor.

Figure 10:
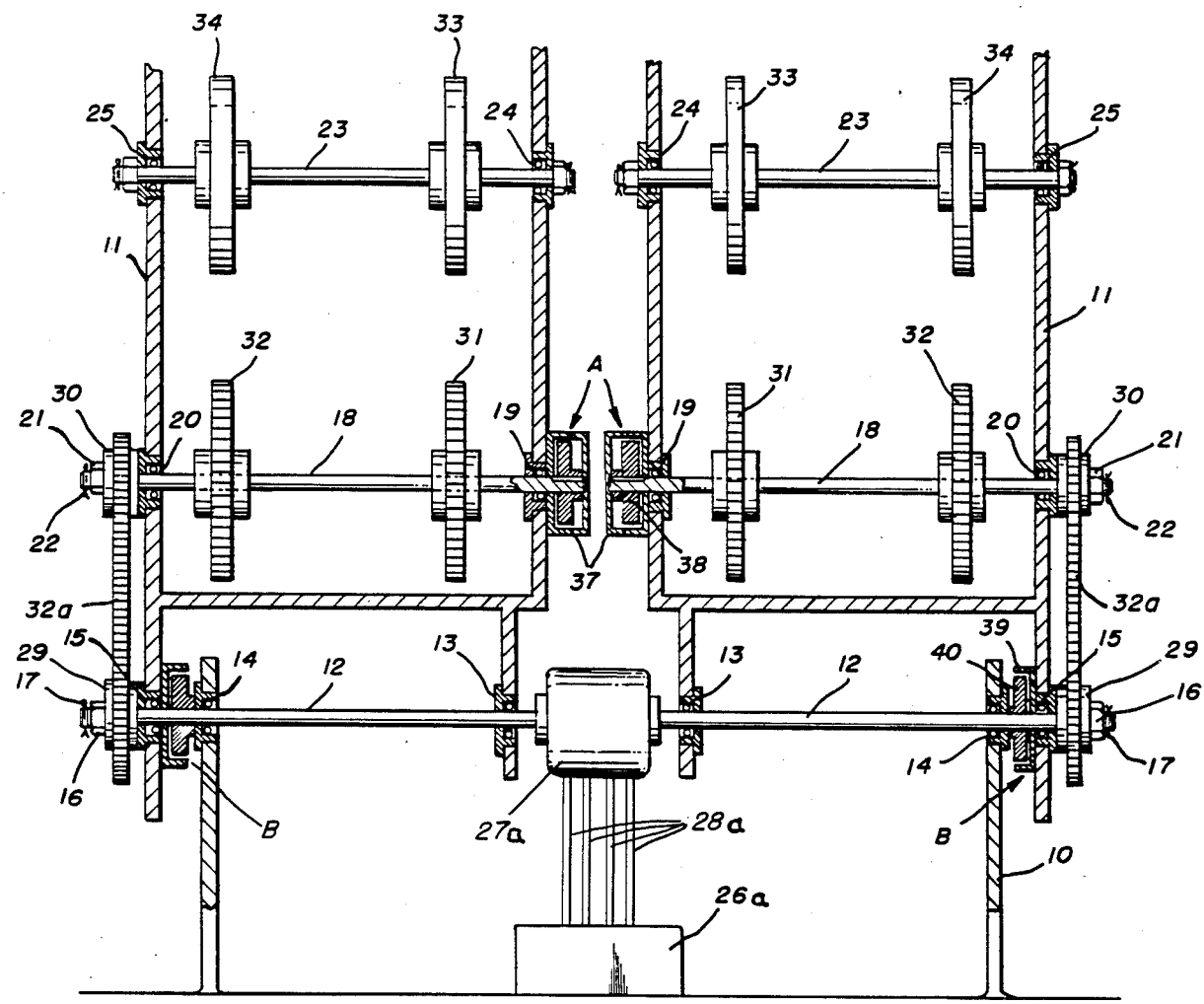
FIGS. 10 and 11 are further modified forms of the invention and correspond generally to FIGS. 3 and 9 respectively.
Figure 11:
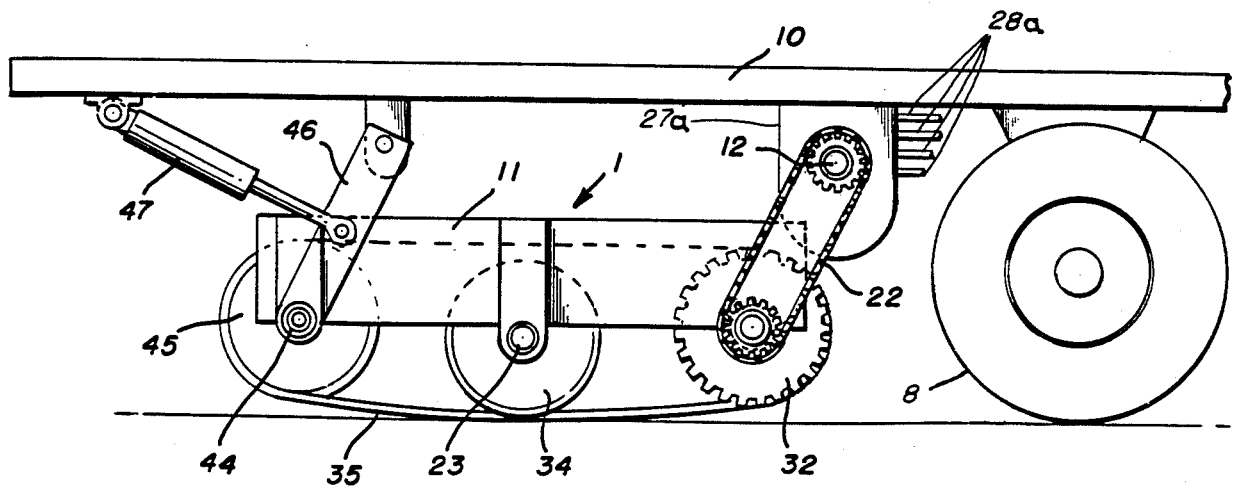

A further modified form of the invention is shown in FIGS. 10 and 11. Essentially FIG. 10 corresponds to FIG. 3 and FIG. 11 corresponds to FIG. 9. The same numerals are used for corresponding elements in the various drawing views. In FIG. 10, the numeral 26a designates a hydraulic pump which is operably connected to hydraulic motor 27a by means of flexible hydraulic hoses 28a. The apparatus shown in FIG. 11 operates essentially the same as that shown in FIG. 9 with the propuslion provided by hydraulic pump and motor means as shown schematically in FIG. 10.

INDUSTRIAL APPLICABILITY

By this invention, apparatus is provided which considerably extends the use and versatility of both wheeled and tracked vehicles over difficult terrain such as mud, sand and snow. In addition the apparatus will aid in climbing banks, moving through ditches and maneuvering over logs and large rocks. In addition means is provided for positioning the apparatus in various attitudes to meet a variety of conditions and which at the same time is inexpensive, reliable and can be easily adapted for use in connection with conventional roadway vehicles. In summary the invention provides all of the advantages of a fully tracked vehicle but can be utilized in such manner that the vehicle can be quickly converted from use with a track over to wheeled use such as on a highway.

I claim:

1. Apparatus for increasing vehicle mobility with the vehicle having a vehicle frame and comprising a framework, a first shaft rotatably mounted on said framework, a second shaft rotatably mounted on said framework and disposed generally parallel to said first shaft, a power source operable to rotate said first shaft, means interconnecting said first and second shafts to impart rotation to said second shaft, at least one wheel fixed to said second shaft and being coaxial therewith, track means mounted on the periphery of said wheel, a first brake means associated with said first shaft and operable to fix said framework to said vehicle frame, and a second brake means associated with said second shaft and being operable to fix said framework to said second shaft.

2. Apparatus according to claim 1 wherein said apparatus is raised and lowered and wherein the midpoint of the bottom portion of said track means is lower than the ends thereof when said apparatus is in the lowered position.

3. Apparatus according to claim 1 wherein said apparatus is raised and lowered by means of said first brake means and wherein said vehicle comprises a pair of wheel axles and wherein said apparatus is disposed above an imaginary horizontal plane disposed in concidence with the lowermost portion of said wheel axles when said apparatus is in the raised position.

4. Apparatus according to claim 1 wherein third, fourth and fifth shafts are rotatably mounted on said framework and are disposed generally parallel to said first and second shafts.

5. Apparatus according to claim 4 wherein at least one wheel is fixed respectively to each of said third, fourth and fifth shafts and said track means is mounted on the peripheries thereof.

6. Apparatus according to claim 5 wherein the axes of said second, third, fourth and fifth shafts are disposed in an imaginary plane which is disposed at an angle approximately 90° to an imaginary plane in coincidence with the axes of said first and second shafts.

7. Apparatus according to claim 1 wherein third, fourth and fifth shafts are rotatably mounted on said framework and wherein the axes of said third and fourth shafts are disposed lower than said second and fifth shafts when said apparatus is disposed in the lowered position.

8. Apparatus according to claim 1 wherein said apparatus is fixed to said vehicle frame and extends forwardly therefrom.

9. Apparatus according to claim 1 wherein said power source comprises a differential.

10. Apparatus according to claim 1 wherein said power source comprises a transaxle.

11. Apparatus according to claim 10 wherein hydraulic control means is operable in association with said transaxle.

12. Apparatus according to claim 1 wherein said power source comprises a mechanical power take off.

13. Apparatus according to claim 1 wherein said power source comprises a hydrostatic motor.

14. Apparatus according to claim 1 wherein said power source comprises a hydraulic pump and motor means.

15. Apparatus according to claim 10 wherein a manual shift is operable in association with said transaxle.

16. Apparatus according to claim 10 wherein a gear drive is operable in association with said transaxle.

17. Apparatus according to claim 10 wherein a chain drive is operable in association with said transaxle.

18. Apparatus according to claim 1 wherein said first and second brake means embody clutch mechanisms.

19. Apparatus for increasing vehicle mobility with the vehicle having a vehicle frame and comprising a framework, a first shaft rotatably mounted on said framework, a second shaft rotatably mounted on said framework and disposed generally parallel to said first shaft, a power source operable to rotate said first shaft, means interconnecting said first and second shafts to impart rotation to said second shaft, at least one wheel fixed to said second shaft and being coaxial therewith, track means mounted on the periphery of said wheel, brake means operable to fix said framework to said second shaft, a support member pivotally mounted at one end on said vehicle frame and at the other end on said second shaft, means for raising and lowering said apparatus secured at one end to said vehicle frame and pivotally mounted at the other end on said support member, said vehicle comprising a pair of spaced wheel axles, and said apparatus being fixed to said vehicle frame and disposed between said wheel axles.

20. Apparatus according to claim 19 wherein said power source comprises hydraulic pump and motor means.

* * * * *